United States Patent
Legler et al.

(10) Patent No.: US 9,891,831 B2
(45) Date of Patent: Feb. 13, 2018

(54) DUAL DATA STORAGE USING AN IN-MEMORY ARRAY AND AN ON-DISK PAGE STRUCTURE

(71) Applicants: Thomas Legler, Walldorf (DE); David Wein, St. Paul, MN (US); Ivan Schreter, Malsch (DE); Mihnea Andrei, Issy les Moulineaux (FR); Anil Kumar Goel, Ontario (CA); Guenter Radestock, Karlsruhe (DE)

(72) Inventors: Thomas Legler, Walldorf (DE); David Wein, St. Paul, MN (US); Ivan Schreter, Malsch (DE); Mihnea Andrei, Issy les Moulineaux (FR); Anil Kumar Goel, Ontario (CA); Guenter Radestock, Karlsruhe (DE)

(73) Assignee: SAP SE, Walldorf (DE)

( * ) Notice: Subject to any disclaimer, the term of this patent is extended or adjusted under 35 U.S.C. 154(b) by 278 days.

(21) Appl. No.: 14/553,859

(22) Filed: Nov. 25, 2014

(65) Prior Publication Data

US 2016/0147457 A1    May 26, 2016

(51) Int. Cl.
*G06F 17/30* (2006.01)
*G06F 3/06* (2006.01)

(52) U.S. Cl.
CPC ............ *G06F 3/0605* (2013.01); *G06F 3/067* (2013.01); *G06F 3/0653* (2013.01); *G06F 17/30315* (2013.01); *G06F 17/30982* (2013.01)

(58) Field of Classification Search
None
See application file for complete search history.

(56) References Cited

U.S. PATENT DOCUMENTS

| | | | |
|---|---|---|---|
| 5,222,235 A | 6/1993 | Hintz et al. | |
| 5,594,898 A | 1/1997 | Dalal et al. | |
| 5,701,480 A | 12/1997 | Raz | |
| 5,717,919 A | 2/1998 | Kodavalla et al. | |
| 5,758,145 A | 5/1998 | Bhargava et al. | |
| 5,794,229 A | 8/1998 | French et al. | |

(Continued)

FOREIGN PATENT DOCUMENTS

| | | |
|---|---|---|
| EP | 2778961 A1 | 9/2014 |
| WO | WO-01/29690 A2 | 4/2001 |

OTHER PUBLICATIONS

"HANA database lectures—Outline Part 1 Motivation—Why main memory processing." Mar. 2014 (Mar. 2014). XP055197666. Web. Jun. 23, 2015.; URL:http://cse.yeditepe.edu.tr/-odemir/spring2014/cse415/HanaDatabase.pdf.

"Optimistic concurrency control." Wikipedia: The Free Encyclopedia. Wikimedia Foundation, Inc., Jul. 19, 2014. Web. Mar. 3, 2016.

Extended European Search report issued in European patent application No. 15003072.4, dated and received Apr. 6, 2016.

Jens Krueger et al. "Main Memory Databases for Enterprise Applications." Industrial Engineering and Engineering Management (IE &EM), 2011 IEEE 18th International Conference on, IEEE, Sep. 3, 2011 (Sep. 3, 2011), pp. 547-557, XP032056073.

(Continued)

*Primary Examiner* — James Trujillo
*Assistant Examiner* — Aida Tessema
(74) *Attorney, Agent, or Firm* — Mintz Levin Cohn Ferris Glovsky and Popeo, P.C.

(57) ABSTRACT

The subject matter disclosed herein provides methods for the dual storage of data using an in-memory array and an on-disk page structure. An in-memory array holding a column of data can be maintained. One or more pages can be maintained. Each of the one or more pages can have one or more rows for storing the column of data. Random access can be provided to a subset of the one or more rows by at least loading the subset of rows from the one or more pages to the in-memory array without loading all of the rows from the one or more pages. Related apparatus, systems, techniques, and articles are also described.

21 Claims, 11 Drawing Sheets

(56) References Cited

U.S. PATENT DOCUMENTS

| | | | |
|---|---|---|---|
| 5,870,758 | A | 2/1999 | Bamford et al. |
| 5,933,833 | A | 8/1999 | Musashi |
| 6,275,830 | B1 | 8/2001 | Muthukkaruppan et al. |
| 6,282,605 | B1 | 8/2001 | Moore |
| 6,490,670 | B1 | 12/2002 | Collins et al. |
| 6,606,617 | B1 | 8/2003 | Bonner et al. |
| 6,668,263 | B1 | 12/2003 | Cranston et al. |
| 6,754,653 | B2 | 6/2004 | Bonner et al. |
| 6,865,577 | B1 | 3/2005 | Sereda |
| 7,698,712 | B2 | 4/2010 | Schreter |
| 8,024,296 | B1 | 9/2011 | Gopinathan et al. |
| 8,161,024 | B2 | 4/2012 | Renkes et al. |
| 8,364,648 | B1 | 1/2013 | Sim-Tang |
| 8,510,344 | B1 | 8/2013 | Briggs et al. |
| 8,650,583 | B2 | 2/2014 | Schreter |
| 8,732,139 | B2 | 5/2014 | Schreter |
| 8,768,891 | B2 | 7/2014 | Schreter |
| 9,058,268 | B1 | 6/2015 | Ostiguy et al. |
| 9,098,522 | B2 | 8/2015 | Lee et al. |
| 9,141,435 | B2 | 9/2015 | Wein |
| 9,262,330 | B2 | 2/2016 | Muthukumarasamy |
| 9,268,810 | B2 | 2/2016 | Andrei et al. |
| 9,275,095 | B2 | 3/2016 | Bhattacharjee et al. |
| 9,275,097 | B2 | 3/2016 | DeLaFranier et al. |
| 9,305,046 | B2 | 4/2016 | Bhattacharjee et al. |
| 9,372,743 | B1 | 6/2016 | Sethi et al. |
| 9,489,409 | B2 | 11/2016 | Sharique et al. |
| 2001/0051944 | A1 | 12/2001 | Lim et al. |
| 2002/0107837 | A1 | 8/2002 | Osborne et al. |
| 2002/0156798 | A1 | 10/2002 | Larue et al. |
| 2003/0028551 | A1 | 2/2003 | Sutherland |
| 2003/0065652 | A1 | 4/2003 | Spacey |
| 2003/0204534 | A1 | 10/2003 | Hopeman et al. |
| 2003/0217075 | A1 | 11/2003 | Nakano et al. |
| 2004/0034616 | A1* | 2/2004 | Witkowski ........ G06F 17/30592 |
| 2004/0054644 | A1 | 3/2004 | Ganesh et al. |
| 2004/0249838 | A1 | 12/2004 | Hinshaw et al. |
| 2005/0027692 | A1 | 2/2005 | Shyam et al. |
| 2005/0097266 | A1 | 5/2005 | Factor et al. |
| 2005/0234868 | A1 | 10/2005 | Terek et al. |
| 2008/0046444 | A1 | 2/2008 | Fachan et al. |
| 2008/0247729 | A1 | 10/2008 | Park |
| 2009/0064160 | A1 | 3/2009 | Larson et al. |
| 2009/0094236 | A1 | 4/2009 | Renkes et al. |
| 2009/0254532 | A1 | 10/2009 | Yang et al. |
| 2009/0287737 | A1 | 11/2009 | Hammerly |
| 2010/0082545 | A1 | 4/2010 | Bhattacharjee et al. |
| 2010/0088309 | A1 | 4/2010 | Petculescu et al. |
| 2010/0287143 | A1 | 11/2010 | Di Carlo et al. |
| 2011/0087854 | A1 | 4/2011 | Rushworth et al. |
| 2011/0145835 | A1 | 6/2011 | Rodrigues et al. |
| 2011/0153566 | A1 | 6/2011 | Larson et al. |
| 2011/0302143 | A1 | 12/2011 | Lomet |
| 2012/0011106 | A1 | 1/2012 | Reid et al. |
| 2012/0047126 | A1 | 2/2012 | Branscome et al. |
| 2012/0102006 | A1 | 4/2012 | Larson et al. |
| 2012/0137081 | A1 | 5/2012 | Shea |
| 2012/0179877 | A1 | 7/2012 | Shriraman et al. |
| 2012/0191696 | A1 | 7/2012 | Renkes et al. |
| 2012/0233438 | A1 | 9/2012 | Bak et al. |
| 2012/0265728 | A1 | 10/2012 | Plattner et al. |
| 2012/0284228 | A1 | 11/2012 | Ghosh et al. |
| 2013/0054936 | A1 | 2/2013 | Davis |
| 2013/0091162 | A1 | 4/2013 | Lewak |
| 2013/0097135 | A1 | 4/2013 | Goldberg |
| 2013/0346378 | A1 | 12/2013 | Tsirogiannis et al. |
| 2014/0025651 | A1 | 1/2014 | Schreter |
| 2014/0101093 | A1 | 4/2014 | Lanphear et al. |
| 2014/0214334 | A1 | 7/2014 | Plattner et al. |
| 2014/0279930 | A1 | 9/2014 | Gupta et al. |
| 2014/0279961 | A1* | 9/2014 | Schreter ............ G06F 17/30315 707/693 |
| 2015/0039573 | A1 | 2/2015 | Bhattacharjee et al. |
| 2015/0089125 | A1* | 3/2015 | Mukherjee ............. G06F 15/78 711/104 |
| 2015/0113026 | A1 | 4/2015 | Sharique et al. |
| 2015/0142819 | A1 | 5/2015 | Florendo et al. |
| 2016/0103860 | A1 | 4/2016 | Bhattacharjee et al. |
| 2016/0125022 | A1 | 5/2016 | Rider et al. |
| 2016/0147445 | A1 | 5/2016 | Schreter et al. |
| 2016/0147447 | A1 | 5/2016 | Blanco et al. |
| 2016/0147448 | A1 | 5/2016 | Schreter et al. |
| 2016/0147449 | A1 | 5/2016 | Andrei et al. |
| 2016/0147459 | A1 | 5/2016 | Wein et al. |
| 2016/0147617 | A1 | 5/2016 | Lee et al. |
| 2016/0147618 | A1 | 5/2016 | Lee et al. |
| 2016/0147750 | A1 | 5/2016 | Blanco et al. |
| 2016/0147776 | A1 | 5/2016 | Florendo et al. |
| 2016/0147778 | A1 | 5/2016 | Schreter et al. |
| 2016/0147786 | A1 | 5/2016 | Andrei et al. |
| 2016/0147801 | A1 | 5/2016 | Wein et al. |
| 2016/0147804 | A1 | 5/2016 | Wein et al. |
| 2016/0147806 | A1 | 5/2016 | Blanco et al. |
| 2016/0147808 | A1 | 5/2016 | Schreter et al. |
| 2016/0147809 | A1 | 5/2016 | Schreter et al. |
| 2016/0147811 | A1 | 5/2016 | Eluri et al. |
| 2016/0147812 | A1 | 5/2016 | Andrei et al. |
| 2016/0147813 | A1 | 5/2016 | Lee et al. |
| 2016/0147814 | A1 | 5/2016 | Goel et al. |
| 2016/0147819 | A1 | 5/2016 | Schreter et al. |
| 2016/0147820 | A1 | 5/2016 | Schreter |
| 2016/0147821 | A1 | 5/2016 | Schreter et al. |
| 2016/0147834 | A1 | 5/2016 | Lee et al. |
| 2016/0147858 | A1 | 5/2016 | Lee et al. |
| 2016/0147859 | A1 | 5/2016 | Lee et al. |
| 2016/0147861 | A1 | 5/2016 | Schreter et al. |
| 2016/0147862 | A1 | 5/2016 | Schreter et al. |
| 2016/0147904 | A1 | 5/2016 | Wein et al. |
| 2016/0147906 | A1 | 5/2016 | Schreter et al. |

OTHER PUBLICATIONS

Lemke, Christian, et al. "Speeding Up Queries in Column Stores." *Data Warehousing and Knowledge Discovery Lecture Notes in Computer Science* (2010): 117-29. Web. Apr. 21, 2016.

Lu, Andy. "SAP HANA Concurrency Control." *SAP Community Network*. Oct. 28, 2014. Web. Apr. 22, 2016. <http://scn.sap.com/docs/DOC-57101>.

Mumy, Mark. "SAP Sybase IQ 16.0 Hardware Sizing Guide." *SAP Community Network*. May 12, 2013. Web. Apr. 21, 2016. <http://www.sdn.sap.com/irj/scn/go/portal/prtroot/docs/library/uuid/c0836b4f-429d-3010-a686-c35c73674180?QuickLink=index&overridelayout=true&58385785468058>.

"HANA Persistence: Shadow Pages." Jun. 2013. Yeditepe Üniversitesi Bilgisayar Mühendisli?i Bölümü. Web. Apr. 21, 2016.; <http://cse.yeditepe.edu.tr/~odemir/spring2014/cse415/Persistency.pptx>.

Brown, E. et al. "Fast Incremental Indexing for Full-Text Information Retrieval." *VLDB '94 Proceedings of the 20th International Conference on Very Large Data Bases*. San Francisco: Morgan Kaufmann, 1994.

"HANA database lectures—Outline Part 1 Motivation—Why main memory processing." Mar. 2014 (Mar. 2014). XP055197666. Web. Jun. 23, 2015. 81 pages. URL:http://cse.yeditepe.edu.tr/-odemir/spring2014/cse415/HanaDatabase.pdf.

"Nbit Dictionary Compression," Sybase, May 23, 2013. Web. Mar. 15, 2017 <http://infocenter.sybase.com/help/index.jsp?topic=/com.sybase.infocenter.dc1777.1600/doc/html/wil1345808527844.html>.

Ailamaki, et al., "Weaving Relations for Cache Performance," Proceedings of the the Twenty-Seventh International Conference on Very Large Data Bases, Sep. 11-14th, Orlando, FL, Jan. 1, 2001.

Hector Garcia-Molina, et al., "Database Systems The Second Complete Book Second Edition—Chapter 13—Secondary Storage Management," *Database Systems the Complete Book*, second edition, Jun. 15, 2008.

* cited by examiner

DUAL DATA STORAGE USING AN IN-MEMORY ARRAY AND AN ON-DISK PAGE STRUCTURE

TECHNICAL FIELD

This disclosure relates generally to database storage and, in particular, to the dual storage of data using an in-memory array and an on-disk page structure.

BACKGROUND

Database sizes supported by commercially available database management systems (DBMS) continue to grow as the availability and cost per unit storage of disk-based storage and system memory increases. In general, a database can feature on-disk storage of data, in which data records are stored in one or more tables or other database structures on storage media (e.g. hard disks, optical storage, solid state storage, or the like) and read into main system memory as needed to respond to queries or other database operations. Alternatively, a database can feature in-memory storage of data, in which data records are stored in main system memory. As costs of main system memory continue to decrease, the feasibility of significant use of in-memory features increases. However, data capacity requirements of database systems also continue to increase. As such, hybrid approaches that involve features of both in-memory and on-disk systems are also advantageous.

SUMMARY

Methods and apparatus, including computer program products, are provided for the dual storage of data using an in-memory array and an on-disk page structure.

In one aspect, an in-memory array holding a column of data is maintained. One or more pages are also maintained. Each of the one or more pages has one or more rows for storing the column of data. Random access is provided to a subset of the one or more rows by at least loading the subset of rows from the one or more pages to the in-memory array without loading all of the rows from the one or more pages.

The above methods, apparatus, and computer program products may, in some implementations, further include one or more of the following features.

The in-memory array can have a contiguous block of memory addresses. The contiguous block of memory addresses can support random access of the data when all of the data is loaded into the in-memory array.

The column of data in the in-memory array can include one or more value identifiers.

The one or more value identifiers can be encoded in a native format. The one or more rows on the one or more pages can store the one or more value identifiers in the native format. The native format can use an N-bit encoding scheme.

The one or more rows on the one or more pages cannot store any data for the column when the one or more value identifiers are null values.

The one or more rows on the one or more pages cannot store any data for the column when an identity property applies to the column. The identity property can apply to the column when each value identifier is equal in value to a row position associated with the value identifier.

The loading can be performed when the computing system is being restored.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many technical advantages. For example, in some implementations, storing data in a memory array and a page structure combines the advantages inherent to a traditional disk/page based system and an in-memory database system. Using a memory array, for example, allows data to be written and stored in a memory optimized format. Moreover, using a page structure can support quick random access of data.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated herein and constitute a part of this specification, show certain aspects of the subject matter disclosed herein and, together with the description, help explain some of the principles associated with the subject matter disclosed herein. In the drawings.

DETAILED DESCRIPTION

Like reference symbols in the various drawings indicate like elements.

The current subject matter includes a number of aspects that can be applied individually or in combinations of one or more such aspects to support a unified database table approach that integrates the performance advantages of in-memory database approaches with the reduced storage costs of on-disk database approaches. The current subject matter can be implemented in database systems using in-memory OLAP, for example including databases sized at several terabytes (or more), tables with billions (or more) of rows, and the like; systems using in-memory OLTP (e.g. enterprise resource planning or ERP system or the like, for example in databases sized at several terabytes (or more) with high transactional volumes; and systems using on-disk OLAP (e.g. "big data," analytics servers for advanced analytics, data warehousing, business intelligence environments, or the like), for example databases sized at several petabytes or even more, tables with up to trillions of rows, and the like.

Further, the current subject matter is related and is directed to many aspects as described herein and, in addition, in the following patent application filed concurrently herewith on Nov. 25, 2014 entitled: "In-Memory Database System Providing Lockless Read and Write Operations for OLAP and OLTP Transactions" by inventors Anil Kumar Goel, Ivan Schreter, Juchang Lee, Mihnea Andrei (attorney docket number 54874-063F01US/141088US01), the contents of which are hereby fully incorporated by reference.

Figure 1:
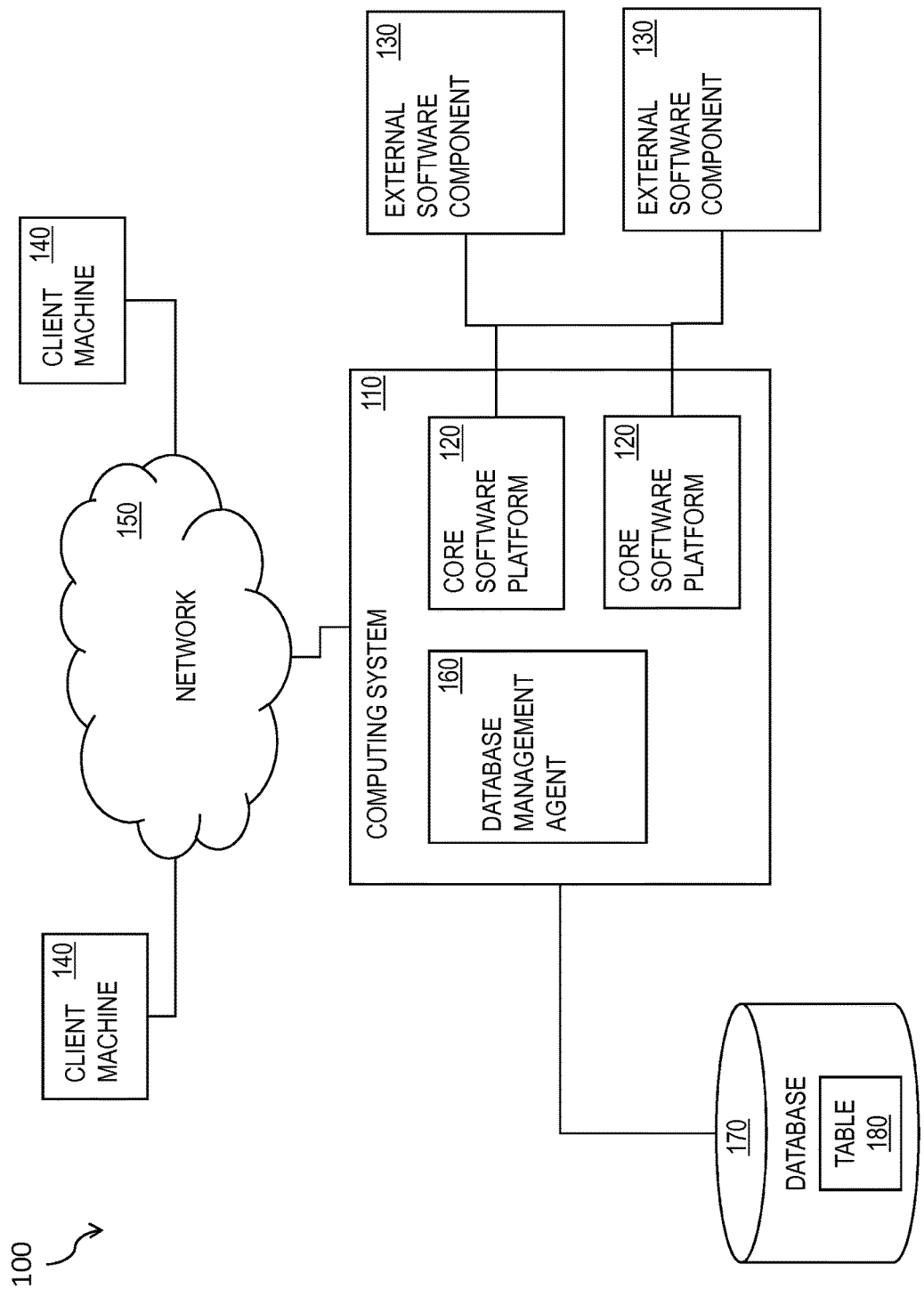
FIG. 1 is a diagram illustrating features of a business software system architecture.

The current subject matter can be implemented as a core software platform of an enterprise resource planning (ERP) system, other business software architecture, or other data-intensive computing application or software architecture that runs on one or more processors that are under the control of a specific organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. FIG. 1 shows a diagram 100 of a system consistent with such an implementation. A computing system 110 can include one or more core software platform modules 120 providing one or more features of the business software system. The computing system can also aggregate or otherwise provide a gateway via which users can access functionality provided by one or more external software components 130. Client machines 140 can access the computing system, either via a direct connection, a local terminal, or over a network 150 (e.g. a local area network, a wide area network, a wireless network, the Internet, or the like).

A database management agent 160 or other comparable functionality can access a database management system 170 that stores and provides access to data (e.g. definitions of business scenarios, business processes, and one or more business configurations as well as data, metadata, master data, etc. relating to definitions of the business scenarios, business processes, and one or more business configurations, and/or concrete instances of data objects and/or business objects that are relevant to a specific instance of a business scenario or a business process, and the like. The database management system 170 can include at least one table 180 and additionally include parallelization features consistent with those described herein.

Figure 2:
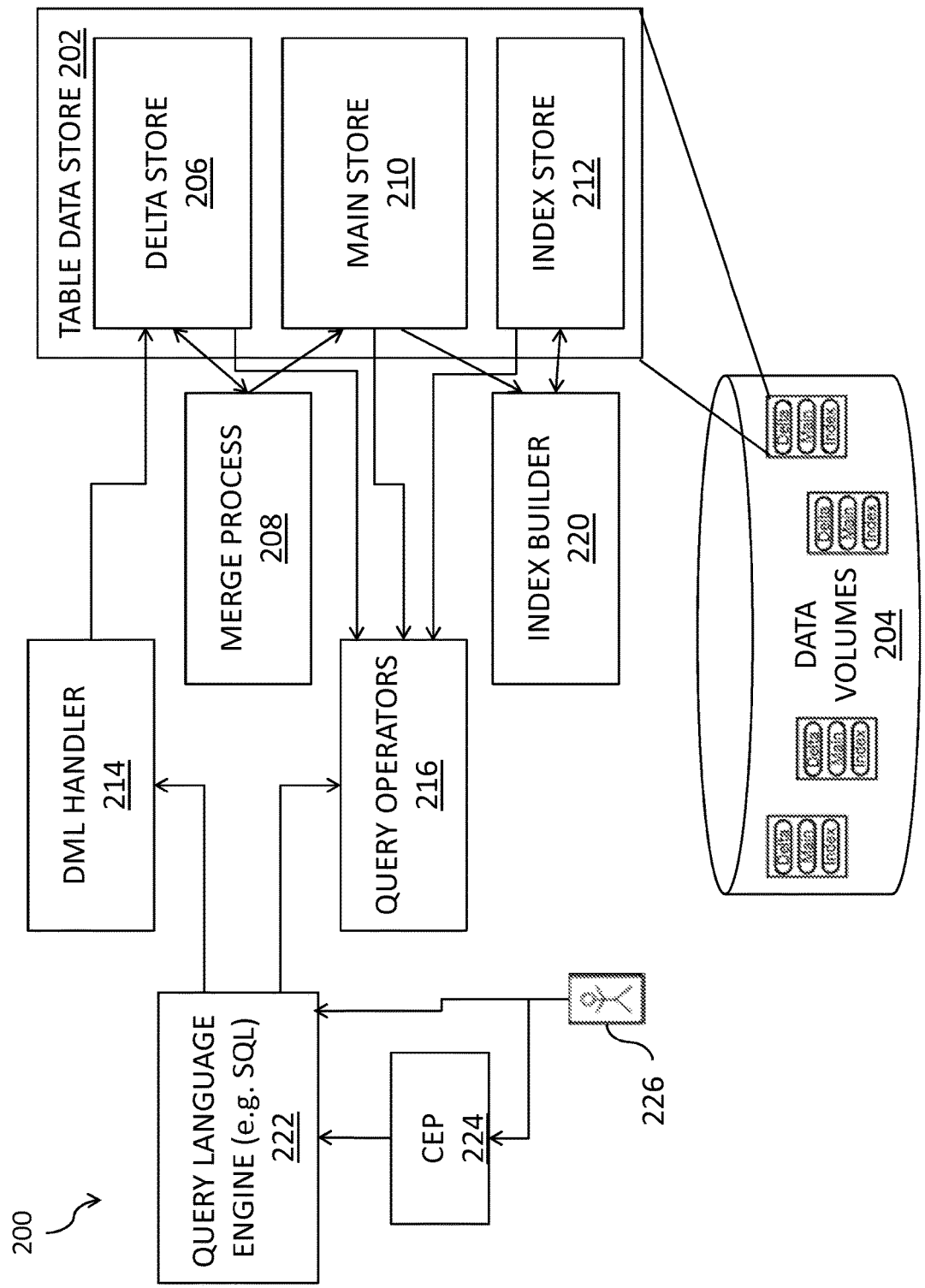
FIG. 2 is another diagram illustrating features of a business software system architecture.

FIG. 2 shows a block diagram of an architecture 200 illustrating features that can be included in a database or database management system consistent with implementations of the current subject matter. A table data store 202, which can be retained among a plurality of data volumes 204, can include one or more of a delta store 206 (e.g. a paged delta part, which can optionally be OLTP optimized and can optionally include a merge process 208), an index store 212 (e.g. one or more segmented indices), and a main store 210. The main store 210 can include a main part that is fragmented consistent with features described herein.

Figure 3:
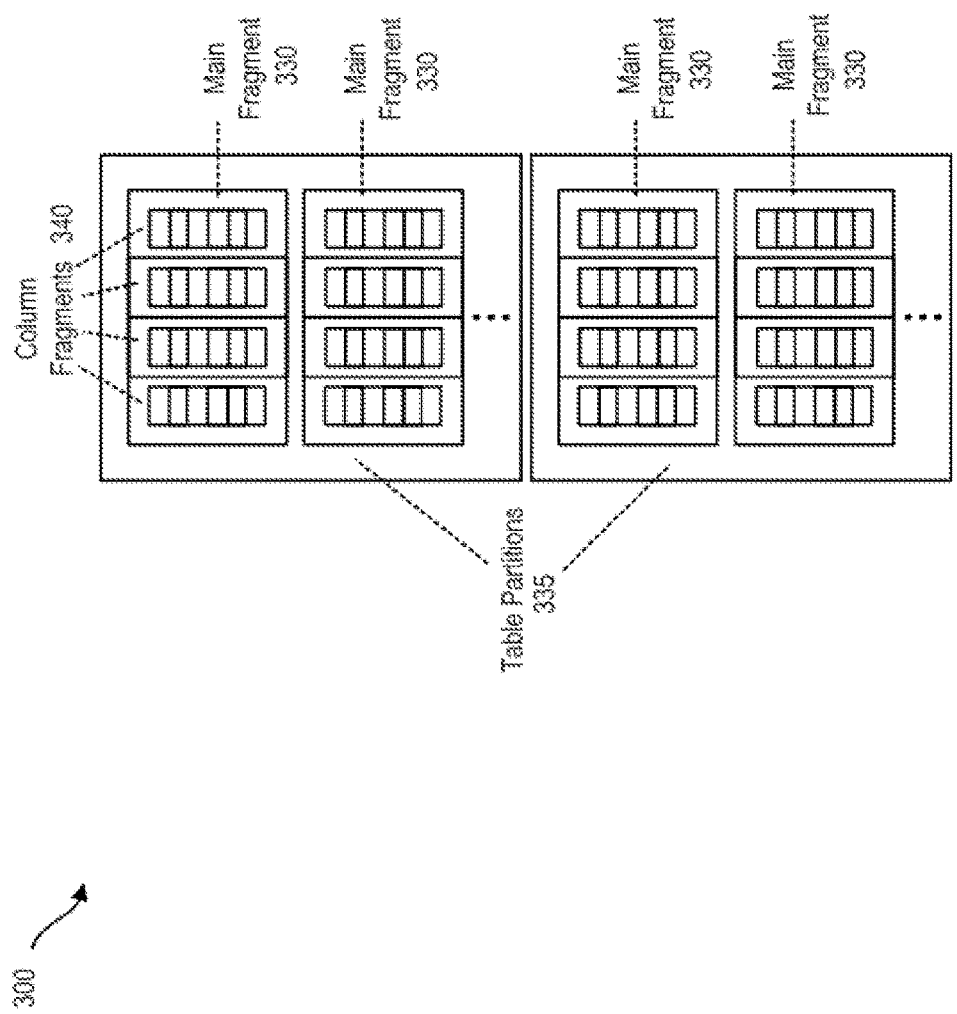
FIG. 3 is a schematic representation of fragments stored in a main store.

To achieve a best possible compression and also to support very large data tables, a main part of the table can be divided into one or more fragments. FIG. 3 shows a schematic representation 300 of the various fragments stored in main store 210. One or more main fragments or fragments 330 can be used for each table or column of a database. Small, manageable tables can be represented with a single fragment. Very large tables can be split into two or more table partitions 335. Each table partition may, in turn, include two or more fragments 330. Fragments 330 can be horizontal slices of the table to which they belong. Each fragment 330 can include one or more column fragments 340. Each column fragment 340 can have its own dictionary and value ID array consistent with the features described herein.

Fragments 330 can advantageously be sufficiently large to gain maximum performance due to optimized compression of the fragment and high in-memory performance of aggregations and scans. Conversely, such fragments can be sufficiently small to load a largest column of any given fragment into memory and to sort the fragment in-memory. Fragments can also be sufficiently small to be able to coalesce two or more partially empty fragments into a smaller number of fragments. As an illustrative and non-limiting example of this aspect, a fragment can contain one billion rows with a maximum of 100 GB of data per column. Other fragment sizes are also within the scope of the current subject matter. A fragment can optionally include a chain of pages. In some implementations, a column can also include a chain of pages. Column data can be compressed, for example using a dictionary and/or any other compression method. Table fragments can be materialized in-memory in contiguous address spaces for maximum performance. All fragments of the database can be stored on-disk, and access to these fragments can be made based on an analysis of the data access requirement of a query.

Referring again to FIG. 2, other parts of the architecture 200 can include a data manipulation language (DML) handling module or similar functionality 214, one or more query handling modules or similar functionality 216 (e.g. including multi-version concurrency control), an index builder 220 that supports the index store 212, a query language engine 222 (which can, for example, be a SQL engine), a complex events processing module (e.g. an event handler, a stream processing module, etc.) 224 for receiving inputs from a user 226, and the like.

Figure 4:
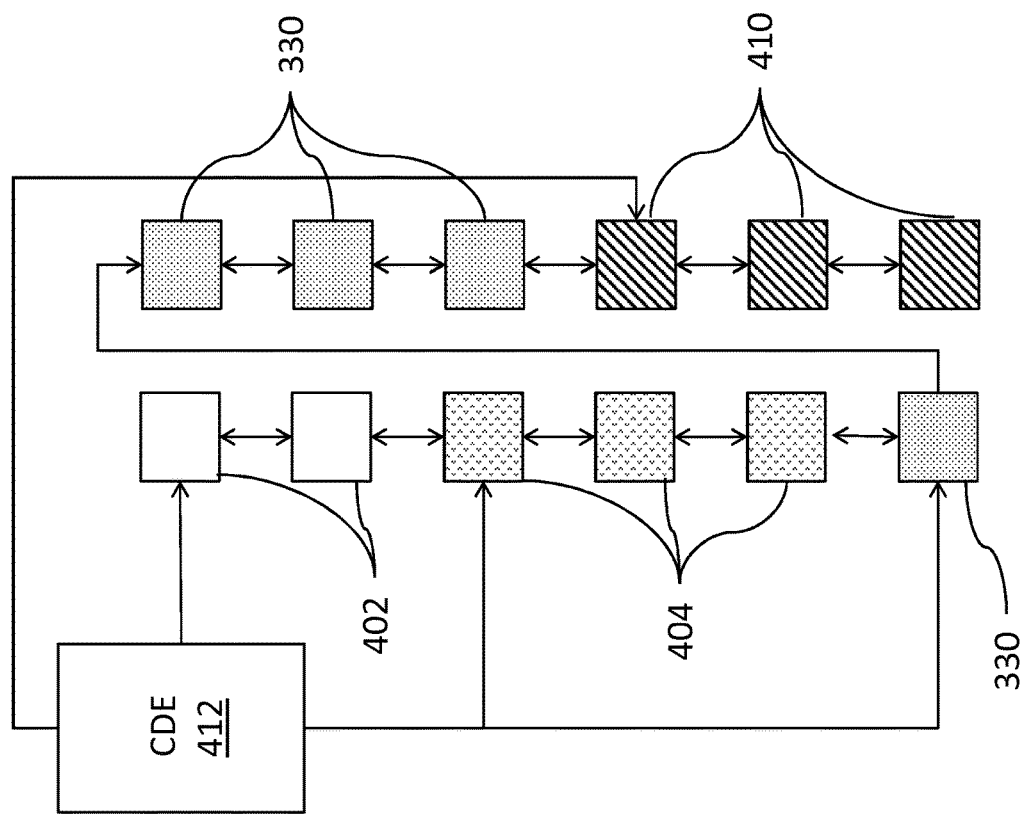
FIG. 4 is a diagram illustrating features of a unified table container page chain.

FIG. 4 shows a block diagram illustrating an example of a unified table container page chain 400. As described above, each fragment can optionally include a chain of pages. In general, a container can be represented as a page chain. A page chain can generally be characterized as a set of pages that are linked in a given order. The term pages, as used herein, refers to a basic unit of storage in a database. A page size is generally established when the database is built and typically cannot be changed. A representative page size can be on the order of 2 kB, 4 kB, 8 kB, 16 kB, or the like. Once the server is built, the value usually cannot be changed. Different types of pages can store different types of database objects. For example, data pages can store data rows or columns for a table. Index pages can store index rows for one or more levels of an index. Large object (LOB) pages can store data for text and image columns, for Java off-row columns, and the like. While FIG. 4 illustrates a single page chain 400, multiple page chains can be used. In some implementations, the multiple page chains can be arranged in accordance with a hierarchy.

Also as shown in FIG. 4, sub-chains of the page chain can be defined for a delta part, a main part, dictionaries, index segments (optionally, not shown in FIG. 2), and the like such that a "whole" of each of these entities contains one or more pages. In some implementations of the current subject matter, a delta part can include both "hot" delta fragments 402 and "cold" delta fragments 404, which can be stored separately. The main part can also be subdivided into main fragments 330. Pages containing dictionary-compressed columnar data 410 can refer to pages containing dictionaries for them. Individual table parts can be loaded into main memory on-demand. A merge process can be decoupled from transaction handling such that a merge process can be executed at recovery time (e.g. during log replay). A page chain, such as the example shown in FIG. 4, can be initiated by a container directory entry (CDE) 412.

A single RowID space can be used across pages in a page chain. A RowID, which generally refers to a logical row in the database, can be used to refer to a logical row in an in-memory portion of the database and also to a physical row in an on-disk portion of the database. A row index typically refers to physical 0-based index of rows in the table. A 0-based index can be used to physically address rows in a contiguous array, where logical RowIDs represent logical order, not physical location of the rows. In some in-memory database systems, a physical identifier for a data record position can be referred to as a UDIV or DocID. Distinct from a logical RowID, the UDIV or DocID (or a comparable parameter) can indicate a physical position of a row (e.g. a data record), whereas the RowID indicates a logical position. To allow a partition of a table to have a single RowID and row index space consistent with implementations of the current subject matter, a RowID can be assigned a monotonically increasing ID for newly-inserted records and for new versions of updated records across fragments. In other words, updating a record will change its RowID, for example, because an update is effectively a deletion of an old record (having a RowID) and insertion of a new record (having a new RowID). Using this approach, a delta store of a table can be sorted by RowID, which can be used for optimizations of access paths. Separate physical table entities can be stored per partition, and these separate physical table entities can be joined on a query level into a logical table.

When an optimized compression is performed during a columnar merge operation to add changes recorded in the delta store to the main store, the rows in the table are generally re-sorted. In other words, the rows after a merge operation are typically no longer ordered by their physical row ID. Therefore, stable row identifier can be used consistent with one or more implementations of the current subject matter. The stable row identifiers can optionally be a logical RowID. Use of a stable, logical (as opposed to physical) RowID can allow rows to be addressed in REDO/UNDO entries in a write-ahead log and transaction undo log. Additionally, cursors that are stable across merges without holding references to the old main version of the database can be facilitated in this manner. To enable these features, a mapping of an in-memory logical RowID to a physical row index and vice versa can be stored. In some implementations of the current subject matter, a RowID column can be added to each table. The RowID column can also be amenable to being compressed in some implementations of the current subject matter.

Figure 5:
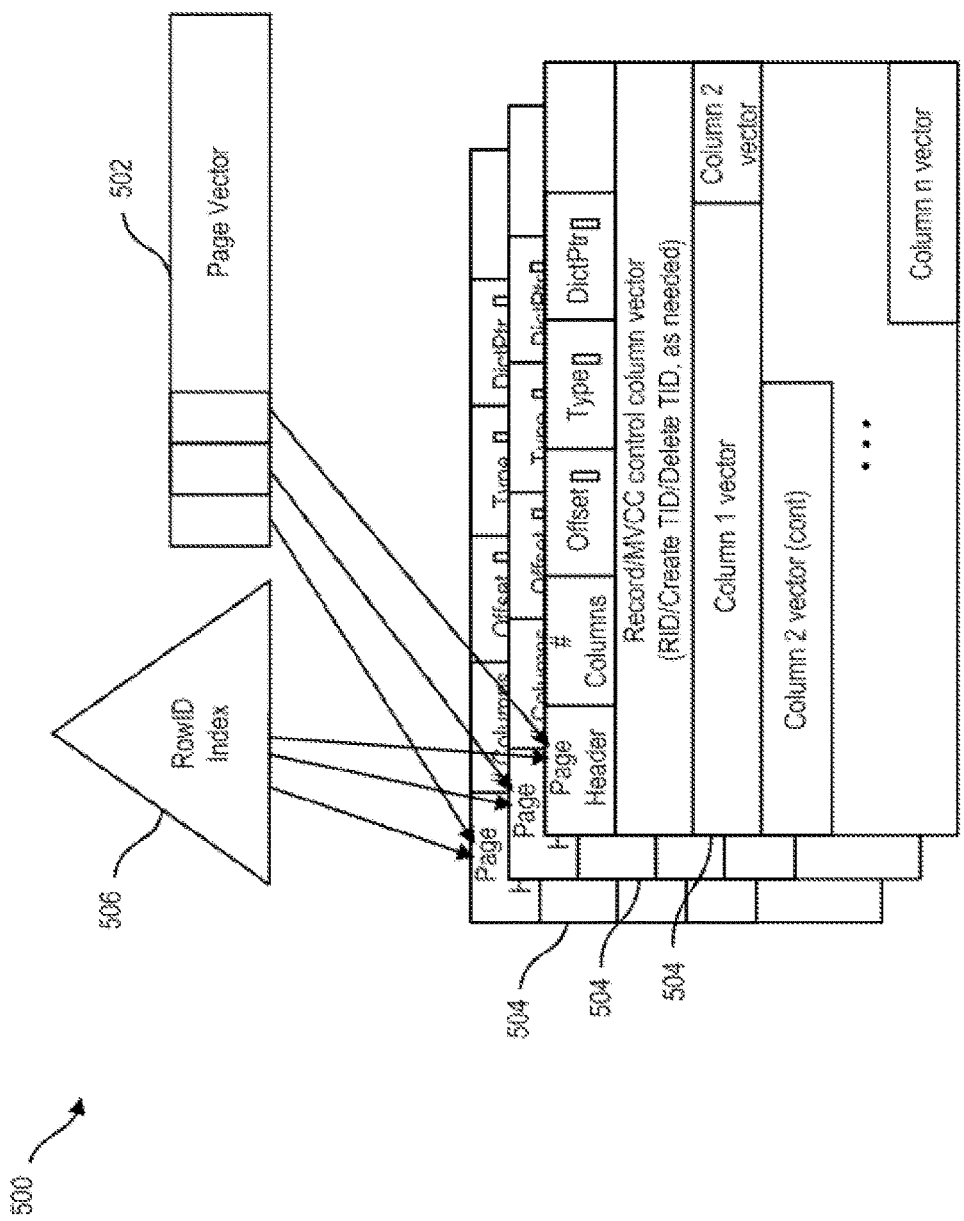
FIG. 5 is a diagram illustrating features of a unified table delta.

FIG. 5 shows a block diagram of a unified table delta 500 consistent with one or more implementations of the current subject matter. In some examples, a "hot" and "cold" delta approach can be used in which uncompressed data are retained in the "hot" delta part, while dictionary-compressed data are retained in the "cold" delta part with a mini-merge performed between the hot and cold parts. Such a delta part can be considered as a single container. As shown in FIG. 5, each delta sub-chain can have its own transient structure. In other words, a separate structure can be used for each delta. A page vector 502 can hold page handles to individual pages 504 and can allow a fast iteration over the pages 504 (for example as part of a column or table scan). A page handle to an individual page 504 can include a pin or the like held in memory. As used herein, the term "pin" refers to holding a particular data page (which may also have been stored on disk) in memory. As an example, if a page is not pinned, it can be cleared from memory. Pinning is typically done on data pages being actively accessed so as to avoid potential performance degradations associated with reading the page from disk into memory.

A RowID index 506 can serve as a search structure to allow a page 504 to be found based on a given interval of RowID values. The search time can be on the order of log n, where n is very small. The RowID index can provide fast access to data via RowID values. For optimization, "new" pages can have a 1:1 association between RowID and row index, so that simple math (no lookup) operations are possible. Only pages that are reorganized by a merge process need a RowID index in at least some implementations of the current subject matter.

Figure 6:
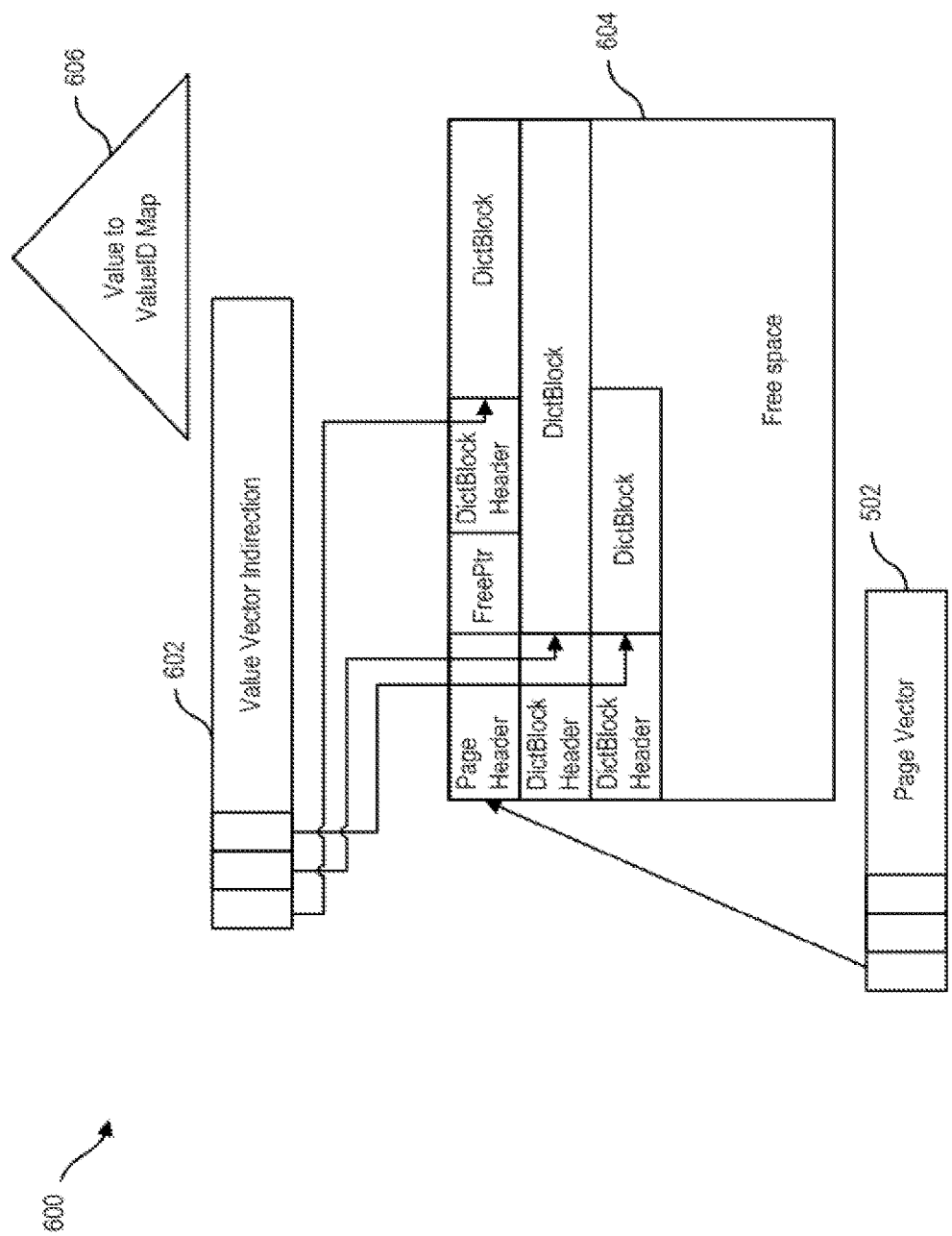
FIG. 6 is a diagram illustrating features of a unified table unsorted dictionary.

FIG. 6 shows a block diagram of a unified table unsorted dictionary 600. Consistent with one or more implementations of the current subject matter, column data in a delta part can use unsorted dictionaries. A transient structure can be provided per delta column dictionary. The page vector 502 can handle pinning of pages in memory. Direct access can be provided via a pointer from other structures. A value vector indirection 602 can allow a same number of values per dictionary block 604. This capability can support an order of 1 performance cost for lookup of a value by ValueID. A dictionary can assign a unique ValueID (typically a numeric value) to each unique value such that the unique values (which are typically larger in memory size than the ValueID) can be stored once rather than multiple times. A value array is a structure used by the dictionary to retrieve values given a ValueID or vice versa. This technique, which can reduce the amount of memory needed to store a set of values where the values are not unique, is typically referred to as dictionary compression. A Value to ValueID map 606 can support hash or B-tree sizes on the order of 1 or on the order of log n for lookup of ValueID by value. A B-tree is a tree data structure that keeps data sorted and allows searches, sequential access, insertions, and deletions in logarithmic time. This capability can be necessary for dictionary compression. A B-tree can be better for range scans but can be more expensive to maintain.

Figure 7:
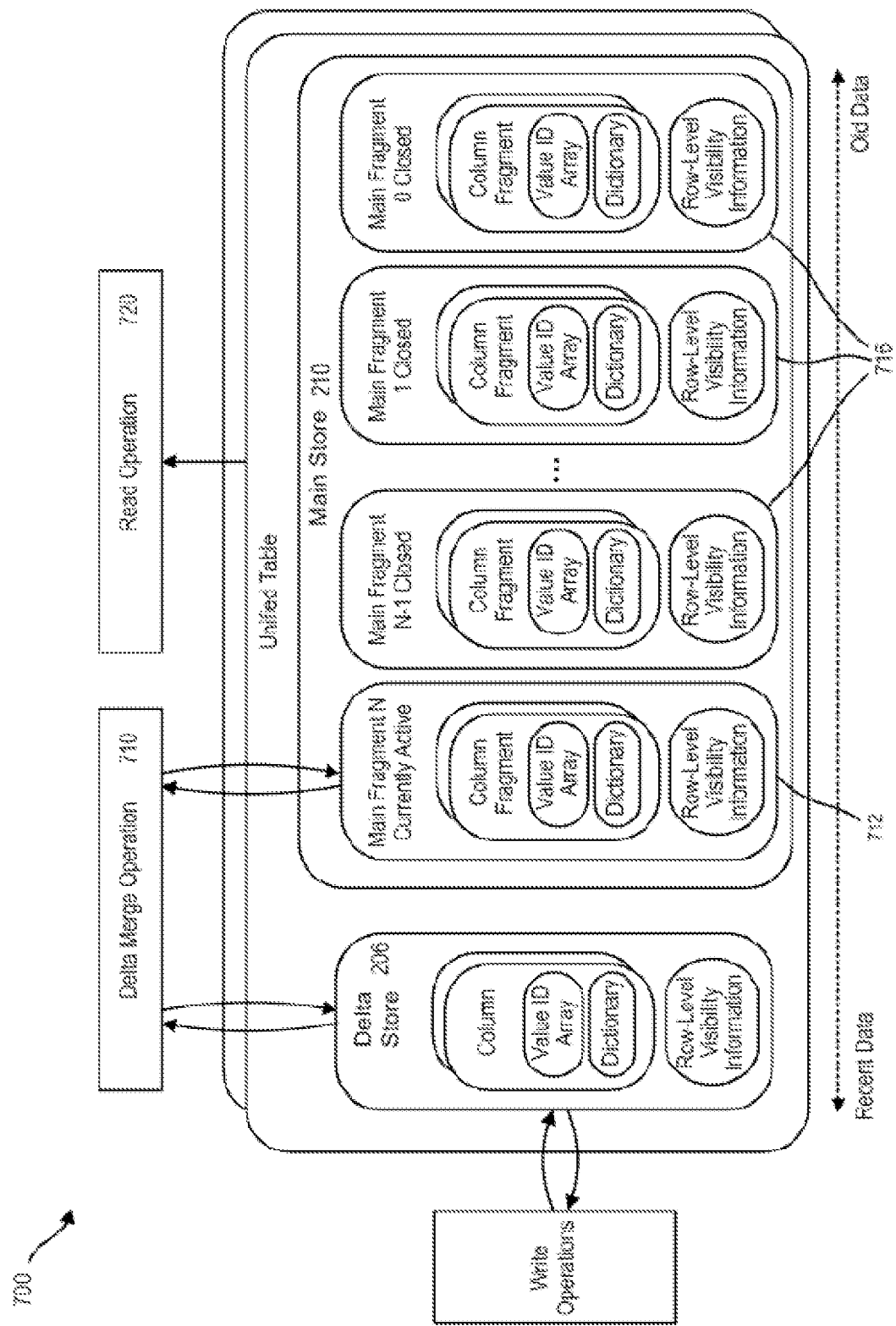
FIG. 7 is a functional block diagram illustrating a delta merge operation and a read operation using a unified table.

FIG. 7 shows a functional block diagram 700 for performing a delta merge operation 710 on a unified table. New transactions or changes can initially be written into delta store 206. Main store 210 can include one active fragment 712 and one or more closed fragments 716. When updates are merged from delta store 206 into the main store 210, existing records in the closed fragments 716 cannot be changed. Instead, new versions of the records can be added to the active fragment 712, and old versions can be marked as invalid.

Functional block diagram 700 also illustrates a read operation 720. Generally, read operations can have access to all fragments (i.e., active fragment 712 and closed fragments 716). Read operations can be optimized by loading only the fragments that contain data from a particular query. Fragments that do not contain such data can be excluded. In order to make this decision, container-level metadata (e.g., a minimum value and/or a maximum value) can be stored for each fragment. This metadata can be compared to the query to determine whether a fragment contains the requested data.

Figure 8:
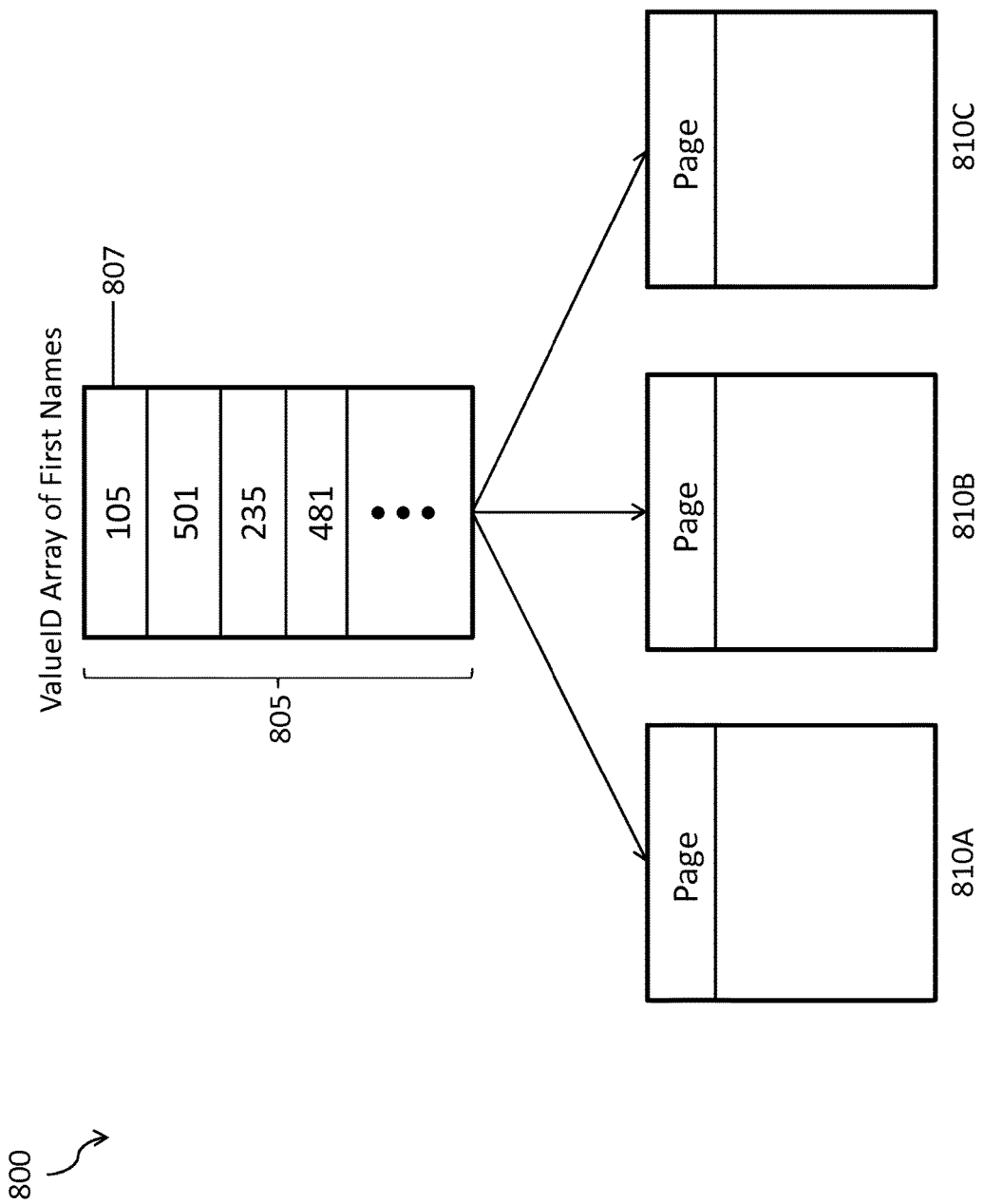
FIG. 8 is a functional block diagram of a system architecture having a memory array and an on-disk page structure.

FIG. 8 is a functional block diagram of a system architecture 800 consistent with implementations of the current subject matter. System 800 combines the benefits of a traditional disk/page based system with the fast memory access available in an in-memory database system, such as SAP's High Performance Analytic Appliance (HANA) database system. System 800 can include an in-memory array, such as memory array 805, that can store data associated with a column of a table. In some implementations, the memory array 805 can include contiguous blocks of memory addresses. While the memory array 805 is illustrated as having a single column in the implementation of FIG. 8, any number of columns can be included. Each memory address can include a value. This value can be a ValueID that is representative of a data value, such as a first name as illustrated in the implementation of FIG. 8. The memory array 805 can also include a starting memory address associated with the first element 807 in the memory array that can be stored as metadata. Once the starting memory address is known, transaction threads can quickly scan, search, or read the memory array 805 as each element in the memory array is sequentially stored at adjacent memory addresses.

Reading and writing individual pages (or blocks of rows on a given page), however, can be problematic when some of the data is not in the memory array 805. In an in-memory database system, such as HANA, the in-memory array can be persisted to disk in a serial manner using a series of pages. Because this data is serially written to disk by breaking the data up across one or more pages, there may be no correlation between the data and the page that it is on. As such, random access to a particular data value or ValueID may not be supported. If, for example, only a specific ValueID is needed during a read or write operation, the entire sequence of pages may be loaded into the in-memory array which can be time consuming.

In order to overcome this deficiency, implementations of the current subject matter mirror the memory array 805 into a separate page based layout, such as pages 810A, 810B, and 810C, when persisting the memory array to disk. Using pages 810A, 810B, and 810C allows system 800 to take advantage of the disk optimized features associated with a disk/page based system. Pages 810A, 810B, and 810C support a lookup mechanism that can track the location of pages in memory. This lookup mechanism can be helpful because pages 810A, 810B, and 810C may not be sequentially stored in memory. In some implementations, this lookup mechanism can use a hash table that correlates page numbers and the contents of each page to memory addresses. Because individual pages can be easily located via this lookup mechanism, system 800 can load individual pages or blocks of rows on individual pages into the memory array 805. This capability can be useful during a system restore process. If, for example, a specific row of data or a subset of rows needs to be restored to the memory array 805 after the system 800 shuts down, this subset of rows can be copied and loaded from at least one of pages 810A, 810B, and 810C. Unlike an in-memory database system which may require all of the rows on pages 810A, 810B, and 810C to be loaded to the memory array 805, implementations of the instant subject matter support random access of data. As such, only the desired subset of rows may be loaded into the memory array 805. Mirroring the memory array 805 into pages 810A, 810B, and 810C paginates the memory array in a manner that supports random access of individual pages and individual rows on pages without requiring the system 800 to serialize all of the data when loading the data back to the memory array.

Figures 9, 10:
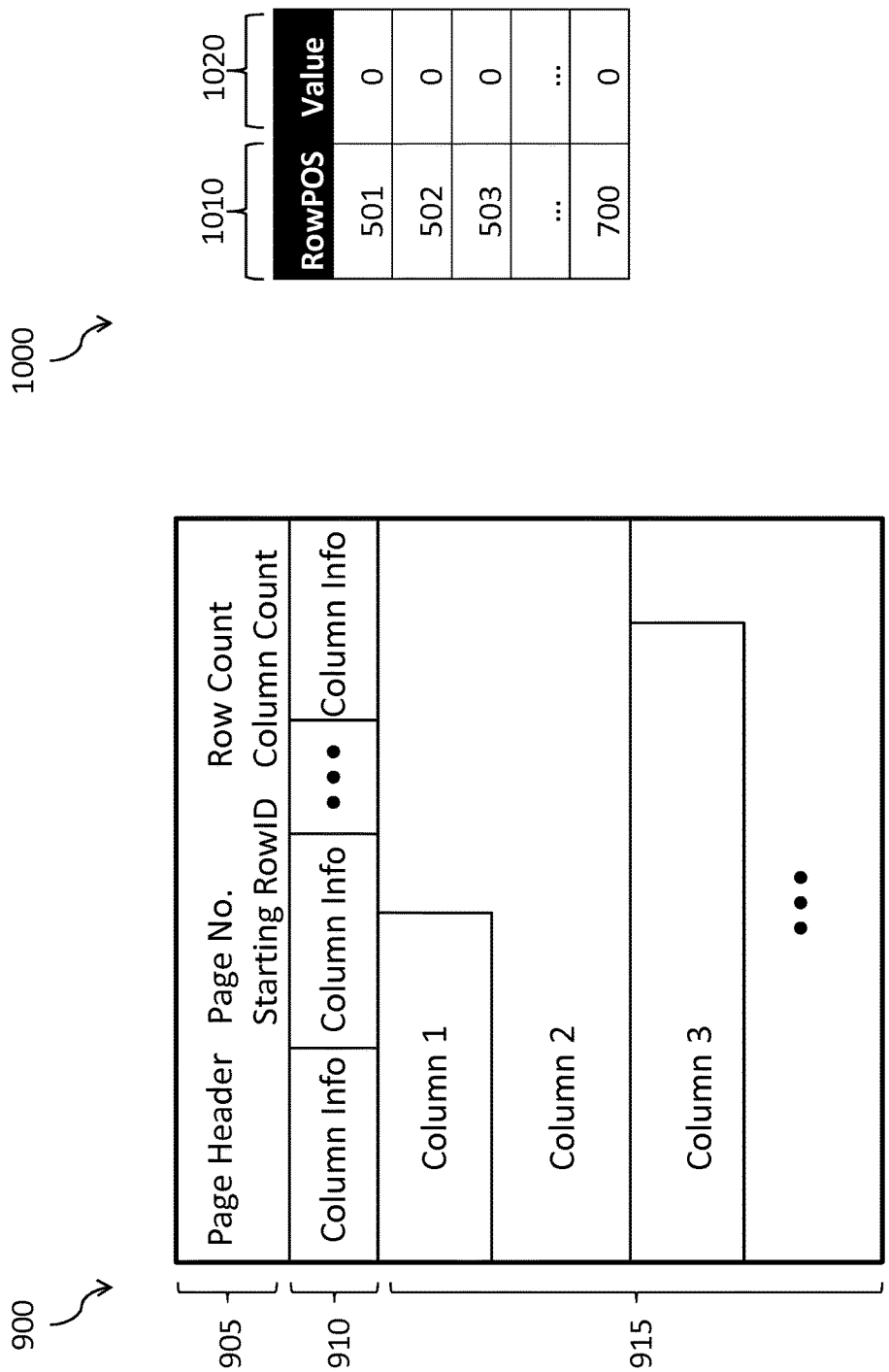
FIG. 9 is a schematic representation of a page.
FIG. 10 is a schematic representation of an unload bitmap.

FIG. 9 illustrates a schematic representation of a page 900. Page 900 includes a page header 905 that provides general information regarding the page. This information can include, for example, the page number, the RowID value of the first row, the number of rows and/or columns on the page 900, and the like. Page 900 can also include several fields that hold column information 910. Generally, each column has its own column information field 910. The column information field 910 can include information representative of the column including, for example, a column identifier, the type of encoding present in the column, the location of the corresponding column data on the page, and the like. Page 900 can also include blocks 915 of column data. Because column data blocks 915 store data of varying size, the column data blocks can also vary in size. In some implementations, page 900 may not include any blocks 915 of column data at all. In these implementations, the metadata in the column information field 910 may be sufficient to reconstruct the data in memory. This scenario can occur when all of the values in the column are set to null or 0. This scenario can also occur when the column information field 910 of a column indicates that an identity property applies to the column. As described above with respect to FIG. 8, the data (i.e., the ValueIDs) in memory array 805 can be copied to pages 810A, 810B, and 810C and stored at various row positions as indicated by column data blocks 915. When the identity property applies, the ValueID may be equal to the row position. For example, a ValueID of 1 may be stored at row position 1 on the page, a ValueID of 2 may be stored at row position 2 on the page, and so on. Because the ValueID is equal to the row position, there may be no need to store the ValueID as it can be reconstructed from the row position. Consequently, the corresponding block 915 of column data may be empty.

The contents of column data blocks 915 can be similar to the contents of memory array 805. As described above with respect to dictionary 600, a dictionary can assign a unique ValueID to each dictionary entry. This unique ValueID is typically a numeric value represented by a string of bits. The number of bits used to represent the ValueID (i.e., the N-bit value ID) can depend on the number of unique values in the dictionary. Like dictionary 600, the data stored in memory array 805 can also include N-bit value IDs. When the data values in memory array 805 are copied to pages 810A, 810B, and 810C, the data can be copied directly using its native N-bit encoded values. By keeping these data values in their native N-bit form at both the memory array 805 and the pages 810A, 810B, and 810C, no additional processing or translation is required to convert these data values between different formats (e.g., expanding and compressing the data values to/from a 32-bit integer format). This configuration can allow system 800 to reduce or minimize the amount of time associated with the copying process.

A bit copy mechanism can be used to copy data from memory array 805 to pages 810A, 810B, and 810C. Memory copies generally start at byte boundaries. During these operations, copying may begin at a source byte and end at a destination byte. Sometimes, however, the data to be copied may be located within the middle of a byte or span multiple bytes. For example, in the implementation of FIG. 8, ValueIDs 105, 501, 235, and 481 may be located within a contiguous block within memory array 805 that begins in the middle of a byte. If, for example, copying is limited to byte boundaries, then these values may be truncated. Rather than limit data copying to the byte boundaries, the bit copy mechanism can start the copying process anywhere within the byte. For example, if it is known that ValueIDs 105, 501, 235, and 481 start and end at particular bits, data copying can be limited to these bits. In some implementations, these start and end bits may coincide with the start and end points of a memory byte or may reside within one or more different memory bytes. Bit copy can also facilitate N-bit encoding of ValueIDs. Pages can contain a range of row positions (e.g., a page may have row positions 100 to 200). With N-bit encoding, row position 100 may begin several bits into a given byte or may span multiple bytes. The bit copy mechanism copies row positions 100 to 200 even if these row positions do not coincide with byte boundaries.

A dedicated thread can copy the data values from memory array 805 to one or more of pages 810A, 810B, and 810C. Specifically, this thread can flush the data values from memory array 805 to one or more of pages 810A, 810B, and 810C using different materialization techniques. Data materialization refers to the process by which data values are copied from a memory layout (such as memory array 805) to a page layout (such as pages 810A, 810B, and 810C). When a transaction thread is trying to insert a data value into a table, the transaction thread can write this data value directly into memory array 805. In order to later copy this data value to one of pages 810A, 810B, and 810C, the transaction thread may need to reserve one or more rows on these pages to store this data value. Reserving a row on a page allows data values to be copied to the row at a later time and indicates that the row positions on the page are in use. Upon reserving a row on a page, the transaction thread may mark the page as pending materialization. Each page can have a corresponding control structure that is stored in system memory. This control structure can store information representative of the runtime transient status of the page. This status can include whether the page is ready for materialization and can be represented using a pending materialization bit. The value of the pending materialization bit can indicate whether the page needs to be materialized. Upon determining that a page is pending materialization, the flusher thread can materialize the data and clear the pending materialization bit. By delegating data materialization responsibilities to a dedicated flusher thread, the transaction thread does not have to write data values to both the memory array 805 and to one of pages 810A, 810B, and 810C. This configuration allows the transaction thread to perform its transaction quickly which, in turn, can lead to good system transaction throughput.

In some implementations, multiple threads may write to memory array 805 in parallel. In doing so, these threads may reserve rows on the same page and may attempt to mark the same page for materialization by changing the value of the pending materialization bit. Marking a page for materialization ensures that the thread's data values will be copied from the memory array 805 to one of pages 810A, 810B, and 810C. Because the pending materialization bit applies to an entire page, the value of this bit may only be set once. For example, transaction threads T1 and T2 may concurrently add data values to memory array 805. In doing so, transaction threads T1 and T2 can reserve rows on a page for materialization, such as page 810A. If transaction thread T1 marks page 810A for materialization by changing the value of the pending materialization bit, then it may be unnecessary for transaction thread T2 to do the same because the entire page is marked for materialization. This configuration provides a lock free mechanism whereby multiple transaction threads can reserve rows on the same page without conflict.

Different protocols can be used to materialize data from the memory array 805 to the pages 810A, 810B, and 810C. These protocols can include an eager materialization protocol, a savepoint materialization protocol, a lazy materialization protocol, and a batch materialization protocol.

In an eager materialization protocol, a transaction thread, such as a DML thread, can write data to both the memory array 805 and to one or more of pages 810A, 810B, and 810C. When a transaction thread inserts a column into a data table, the transaction thread can write the ValueIDs associated with the new column to the memory array 805. In addition, the transaction thread can write these ValueIDs to one or more of pages 810A, 810B, and 810C. In some implementations, the eager materialization protocol can use the optimized bit copy process described above to copy these data values. This protocol is not optimal because the transaction thread performs two write operations (i.e., to the memory array and to the pages) which can increases its execution time and the transaction response time. Also, because multiple transaction threads may write to the same page, contention on the page can increase. This contention can take the form of a mutex (lock) contention, a lock free algorithm execution time, or cache line misses as multiple clients modify data on the same cache lines.

The eager materialization protocol can be optimized in light of the fact that read operations utilize the memory array 805 and not pages 810A, 810B, and 810C. Pages 810A, 810B, and 810C are primarily used for persistence purposes to restore a system after shutdown, for example. Because read operations utilize the memory array 805, there may not be a need to immediately populate pages 810A, 810B, and 810C, as described above with respect to the eager materialization protocol. In some implementations, data materialization can be deferred up until a system savepoint is encountered using a savepoint materialization protocol.

System 800 can maintain a transaction log that records all transactions occurring within the system. These transactions can be persisted to disk. If system 800 crashes, the system can be restored by replaying the transactions in the transaction log. System 800 can enforce various savepoints in order to trigger the persisting of these transactions to disk. In some implementations, the occurrence of a savepoint can trigger a savepoint flusher thread to begin the materialization process. For example, when a savepoint is encountered, the savepoint flusher thread can begin materializing data to one or more of pages 810A, 810B, and 810C in order to avoid losing data. With this protocol, the savepoint flusher thread can be responsible for writing large amounts of data to the data pages. In order to reduce the amount of work done by the savepoint flusher thread, a resource flusher thread can be used in tandem with the savepoint flusher thread. The resource flusher thread can be configured to run at predetermined intervals to materialize modified pages. If a page has not been changed since the last write, then the savepoint flusher thread can safely ignore the page as it may have already been materialized by the resource flusher thread.

The savepoint materialization protocol provides several advantages. First, because the savepoint flusher thread handles data materialization, transaction threads do not need to spend time writing data to the page. This division of duties can reduce or eliminate the response time penalties described above with respect to the eager materialization protocol. Also, because only the savepoint flusher thread materializes data to one or more of pages 810A, 810B, and 810C, contention on the page can be eliminated. In some implementations, the savepoint materialization protocol can use the bit copy mechanism described above to materialize data from the memory array 805 to one or more of pages 810A, 810B, and 810C. Using the bit copy mechanism allows this protocol to copy many rows of data in an efficient manner which, in turn, can yield significant time savings. Generally, it takes less time to copy 1,000 contiguous rows as a single operation than it is to perform 1000 copies of a single row.

In a lazy materialization protocol, the flusher thread can copy data values from the memory array 805 to one or more of pages 810A, 810B, and 810C when a predetermined condition has been met. For example, the flusher thread can flush the data values from the memory array 805 to one or more of pages 810A, 810B, and 810C when a predetermined number or percentage of rows on a page have been reserved. This condition can indicate, for example, that copying should begin when half of the rows on a page have been reserved. Unlike the eager materialization protocol which flushes data from memory array 805 to one of pages 810A, 810B, and 810C as soon as a data value is written to a row in the memory array, the lazy materialization protocol can wait until the predetermined condition is satisfied. In some implementations, the lazy materialization protocol can use the optimized bit copy process described above to copy these data values.

In a batch materialization protocol, the flusher thread can copy data values from the memory array 805 to one of pages 810A, 810B, and 810C when all of the rows on a page have been reserved. As described above, a transaction thread may insert data values or ValueIDs into the memory array 805 one row at a time. Rather than copy these data values one row at a time from the memory array onto a data page as described above with respect to the eager materialization protocol, the batch materialization protocol can copy as many rows as will fit onto a single page at a time. In some implementations, the batch materialization protocol can use the optimized bit copy process described above to copy these data values.

In some implementations, an unload bitmap can be used to optimize the materialization protocols described above. An unload bitmap can track which rows are open on a page. As previously described, when a transaction thread creates a new table and adds a row to the table, the transaction thread can add a row to the memory array 805. Upon doing so, the transaction thread can also allocate a page, such as page 810A. Page 810A can have one or more rows onto which data from the memory array 805 can be later materialized. When a page is first allocated, all of the rows on the page can be initially open (i.e., pending insertion or reservation by a transaction thread). As transaction threads add additional rows to memory array 805, they can reserve additional rows on page 810A for later materialization. The rows on page 810A can be closed as they are reserved by transaction threads. When all of the rows on page 810A are closed, the page can be fully materialized which, in turn, can trigger a flusher thread to copy the data from memory array 805 to page 810A.

FIG. 10 is a schematic representation of an unload bitmap 1000 for a page having row positions 1010. Each row position 1010 can have a corresponding value 1020. In the implementation of FIG. 10, value 1020 can indicate whether a particular row position has been reserved for later materialization by a transaction thread. When the page is newly allocated, all of the row positions can be open and can have a value 1020 equal to 1. As row positions are closed (i.e., reserved for later materialization), the core software platform 120 can change the value 1020 to 0. A page can be ready for materialization when all of the values 1020 in the unload bitmap 1000 are equal to 0. Of course, these values are merely exemplary and different values can be used. In the implementation of FIG. 10, all of the values 1020 are 0. As such, this page can be materialized by a flusher thread.

In order to ensure that all of the rows in the memory array are fully materialized onto a data page, several conditions should be satisfied. As a preliminary matter, when a transaction thread inserts rows into the memory array 805, the thread should ensure that the corresponding page on disk can accommodate these newly inserted rows. If, for example, the capacity of the page cannot accommodate all of these inserted rows, then the transaction thread can allocate additional pages until all of the inserted rows are accounted for.

In addition, the transaction thread should ensure that the page is properly marked as pending materialization. Doing so can trigger a flusher thread to materialize the page. As described above, each page has a control structure that can store a pending materialization bit. As a transaction thread reserves rows on the page, the transaction thread should set the pending materialization bit unless it has already been set by a different transaction thread. Upon seeing that this bit is set, a flusher thread can materialize the page by copying data from the memory array to the page. The core software platform 120 can enforce various mechanisms to avoid race conditions between multiple transaction threads trying to mark a page as pending materialization and a flusher thread trying to materialize the page.

Related to the condition above, the transaction thread should insert data into the memory array before it marks the corresponding page as pending materialization. Doing so can ensure that the memory array is sufficiently populated to support immediate asynchronous materialization by the flusher thread as soon as the pending materialization bit is set.

In some instances, the unload bitmap 1000 can include stale values that cannot be cleared (i.e., set to zero). When this scenario occurs, a transaction thread can encounter an exception that prevents one or more rows on a page from being closed. This scenario may occur, for example, when a thread hits an error on a page before it has a chance to close its reserved rows on the page. Without intervention the page can remain open which, consequently, can delay materialization until a savepoint is encountered. The following processes can be used to resolve this issue.

In an implementation, the core software platform 120 can be configured to close the affected rows on a page when an exception occurs. Forcing the closure of these rows can clear the corresponding values in the unload bitmap. Once all of the rows on the page are cleared, then the page can be materialized by a flusher thread.

In another implementation, the core software platform 120 can be configured to mark a page as closed (i.e., pending materialization) even if there are open rows on the page. Different triggering conditions can be used for this purpose. For example, the core software platform 120 can mark the page as closed when a predetermined number of additional pages are allocated. In another example, the core software platform 120 can close all pages when a savepoint is encountered or after a predetermined period of time has elapsed.

After data is materialized from the memory array 805 to one of pages 810A, 810B, and 810C, the page can be persisted to disk and discarded (i.e., removed from memory). Discarding the page can free the memory used by the page for other purposes and can reduce the memory overhead of the dual memory representation scheme described above.

Figure 11:
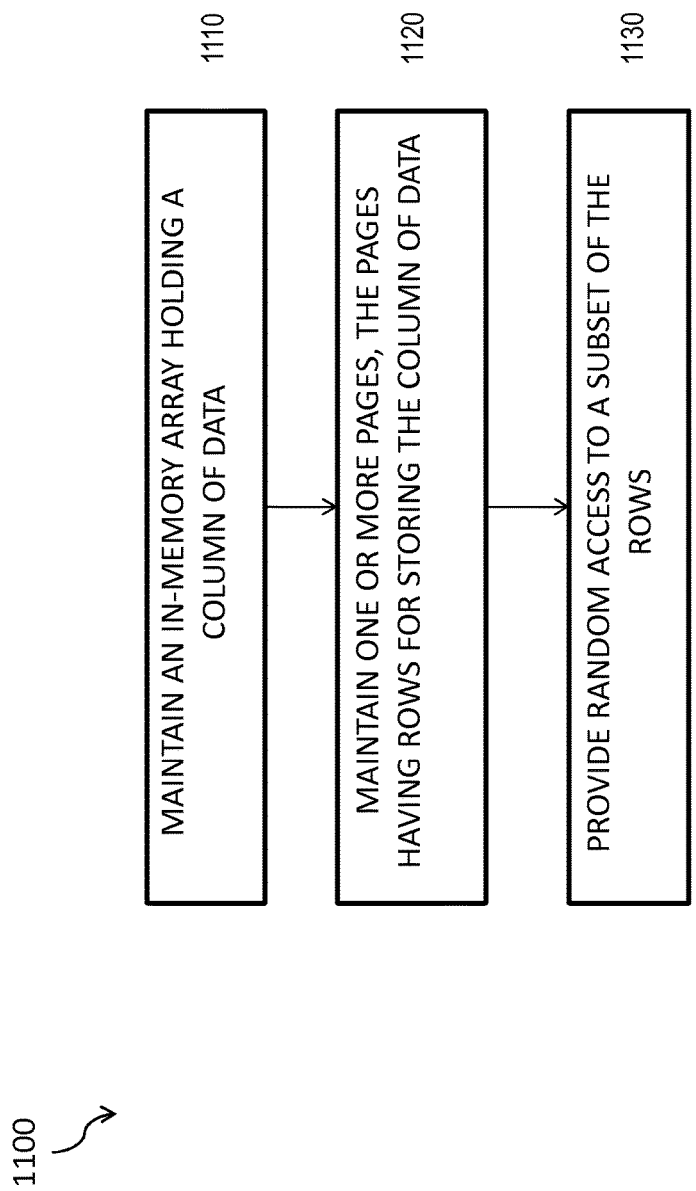
FIG. 11 is a process flow diagram for providing random access to data using a dual memory representation scheme.

FIG. 11 illustrates a flowchart for providing random access to data using the dual memory representation. At 1110, an in-memory array can be maintained. The in-memory array can be memory array 805, for example. Memory array 805 can hold a column of data. In some implementations, the data in memory array 805 can be encoded using a native format (such as an N-bit encoded value).

At 1120, one or more pages, such as pages 810A, 810B, and 810C, can be maintained. The pages can include rows for storing the column of data from the memory array 805.

At 1130, random access can be provided to a subset of the rows on the one or more pages by loading the subset of rows from the one or more pages to the in-memory array. This loading process can be done without loading all of the rows on the pages. Unlike an in-memory database system which serializes all of the data, the use of an in-memory array and page structure supports random access to individual rows of data.

Figure 12:
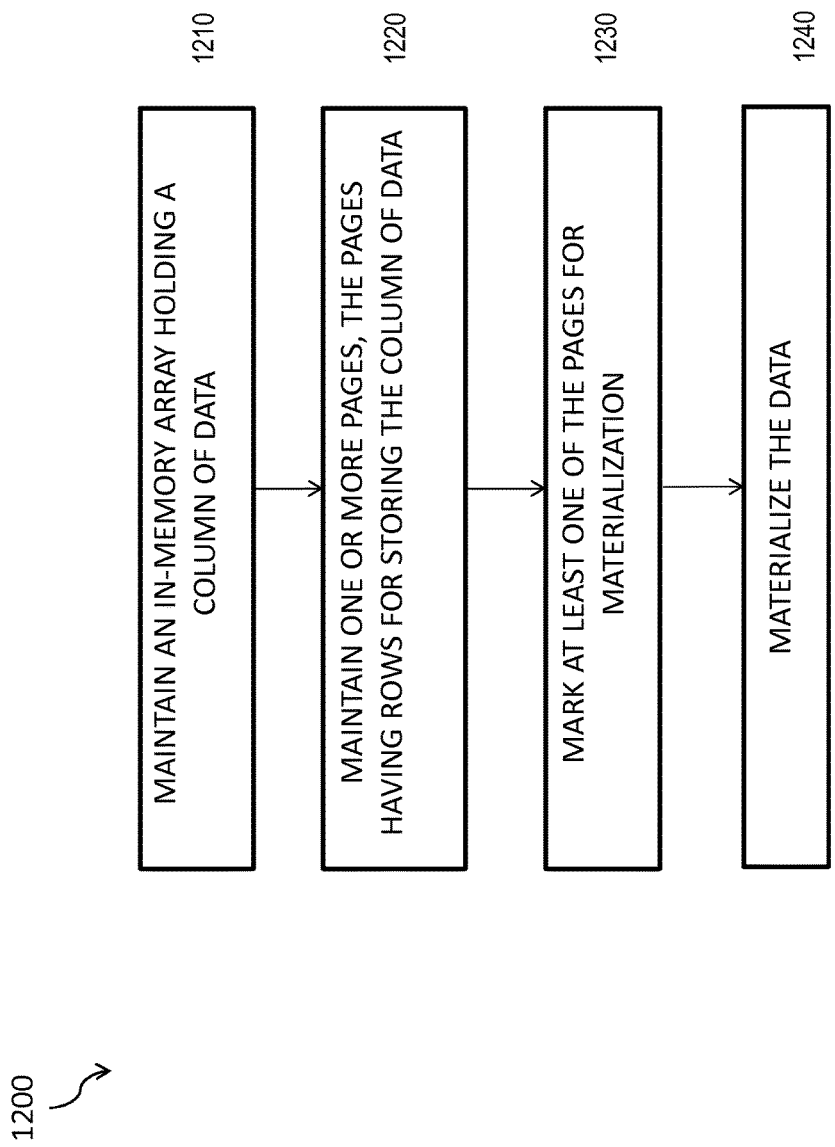
FIG. 12 is a process flow diagram for materializing data from a memory array to a page.

FIG. 12 illustrates a flowchart 1200 for materializing data. At 1210, an in-memory array can be maintained. The in-memory array can be memory array 805, for example. Memory array 805 can hold a column data.

At 1220, one or more pages, such as pages 810A, 810B, and 810C, can be maintained. The pages can include rows for storing the column of data from the memory array 805.

At 1230, one or more of the pages can be marked for materialization. A page can be marked for materialization if, for example, a transaction thread has reserved one or more rows on the page for copying data.

At 1240, data can be materialized by copying the data from the in-memory array to the page. Different materialization protocols can be used including, for example, a lazy materialization protocol or a batch materialization protocol. In some implementations, a save point can initiate the materialization process. In some implementations, an unload bitmap can be used to indicate when a page is ready for materialization. After a page is materialized, the page can be persisted to disk and discarded.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more data processors forming part of at least one computing system, the method comprising:
    storing an in-memory array to disk, the in-memory array including a portion of data from a column of data, and the in-memory array being stored to disk by at least:
        determining, based at least on a content of the portion of data, a page on disk for storing the portion of data;
        storing, in the page, the portion of data from the column of data, the portion of data being stored in a row in the page; and
    providing random access to the portion of data from the column of data, the providing of the random access comprising:
        identifying, based at least on the content of the portion of data, the page storing the portion of data; and
        loading, from disk and into the in-memory array, the row from the page storing the portion of data, the row being loaded without loading another row from the page.

2. The method of claim 1, wherein the in-memory array has a contiguous block of memory addresses, and wherein the contiguous block of memory addresses supports random access of the data when all of the data is loaded into the in-memory array.

3. The method of claim 1, wherein the column of data in the in-memory array includes one or more value identifiers.

4. The method of claim 3, wherein the one or more value identifiers are encoded in a native format, and wherein the row and/or the other row from the page store the one or more value identifiers in the native format.

5. The method of claim 4, wherein the native format uses an N-bit encoding scheme.

6. The method of claim 3, wherein the row and/or the other row from the page do not store any data for the column when the one or more value identifiers are null values.

7. The method of claim 3, wherein the row and/or the other row from the page do not store any data for the column when an identity property applies to the column, and wherein the identity property applies to the column when each value identifier is equal in value to a row position associated with the value identifier.

8. The method of claim 1, wherein the loading is performed when the computing system is being restored.

9. A non-transitory computer-readable medium containing instructions to configure a processor to perform operations comprising:
    storing an in-memory array to disk, the in-memory array including a portion of data from a column of data, and the in-memory array being stored to disk by at least:
        determining, based at least on a content of the portion of data, a page on disk for storing the portion of data;
        storing, in the page, the portion of data from the column of data, the portion of data being stored in a row in the page; and
    providing random access to the portion of data from the column of data, the providing of the random access comprising:
        identifying, based at least on the content of the portion of data, the page storing the portion of data; and
        loading, from disk and into the in-memory array, the row from the page storing the portion of data, the row being loaded without loading another row from the page.

10. The non-transitory computer-readable medium of claim 9, wherein the in-memory array has a contiguous block of memory addresses, and wherein the contiguous block of memory addresses supports random access of the data when all of the data is loaded into the in-memory array.

11. The non-transitory computer-readable medium of claim 9, wherein the column of data in the in-memory array includes one or more value identifiers.

12. The non-transitory computer-readable medium of claim 11, wherein the one or more value identifiers are encoded in a native format, and wherein the row and/or the other row from the page store the one or more value identifiers in the native format.

13. The non-transitory computer-readable medium of claim 11, the row and/or the other row from the page do not store any data for the column when the one or more value identifiers are null values.

14. The non-transitory computer-readable medium of claim 11, wherein the row and/or the other row from the page do not store any data for the column when an identity property applies to the column, and wherein the identity property applies to the column when each value identifier is equal in value to a row position associated with the value identifier.

15. A system comprising:
    at least one processor; and
    at least one memory, wherein the at least one processor and the at least one memory are configured to perform operations comprising:
        storing an in-memory array to a disk, the in-memory array including a portion of data from a column of data, and the in-memory array being stored to disk by at least:
            determining, based at least on a content of the portion of data, a page on disk for storing the portion of data;
            storing, in the page, the portion of data from the column of data, the portion of data being stored in a row in the page; and providing random access to the portion of data from the column of data, the providing of the random access comprising:
identifying, based at least on the content of the portion of data, the page storing the portion of data; and
loading, from the disk and into the in-memory array, the row from the page storing the portion of data, the row being loaded without loading another row from the page.

16. The system of claim 15, wherein the in-memory array has a contiguous block of memory addresses, and wherein the contiguous block of memory addresses supports random access of the data when all of the data is loaded into the in-memory array.

17. The system of claim 15, wherein the column of data in the in-memory array includes one or more value identifiers.

18. The system of claim 17, wherein the one or more value identifiers are encoded in a native format, and wherein the row and/or the other row from the page store the one or more value identifiers in the native format.

19. The system of claim 17, wherein the row and/or the other row from the page do not store any data for the column when the one or more value identifiers are null values.

20. The system of claim 17, wherein the row and/or the other row from the page do not store any data for the column when an identity property applies to the column, and wherein the identity property applies to the column when each value identifier is equal in value to a row position associated with the value identifier.

21. The method of claim 1, wherein the page for storing the portion of data is determined and/or identified based at least on a hash of the content of the portion of data.

* * * * *